Sept. 9, 1941.   L. E. HARPER   2,255,317
CONTROLLING DEVICE
Filed March 2, 1938   4 Sheets-Sheet 1

INVENTOR
LYNDUS E. HARPER
BY *Alfred R. Fuchs*
ATTORNEY

Sept. 9, 1941.  L. E. HARPER  2,255,317
CONTROLLING DEVICE
Filed March 2, 1938  4 Sheets-Sheet 3

INVENTOR
LYNDUS E. HARPER
BY Alfred R. Fuchs
ATTORNEY

Sept. 9, 1941.   L. E. HARPER   2,255,317
CONTROLLING DEVICE
Filed March 2, 1938   4 Sheets-Sheet 4

INVENTOR
LYNDUS E. HARPER
BY Alfred R. Fuchs
ATTORNEY

Patented Sept. 9, 1941

2,255,317

UNITED STATES PATENT OFFICE 2,255,317

CONTROLLING DEVICE

Lyndus E. Harper, Kansas City, Mo.

Application March 2, 1938, Serial No. 193,542

26 Claims. (Cl. 74—1)

My invention relates to controlling devices, and more particularly to means for regulating the speed of a shaft in accordance with a variable condition, which is independent of the rate of rotation of said shaft.

It is a particular purpose of my invention to provide means for controlling the speed of a shaft, by comparing the speed thereof with the speed of another rotatable member that is operated independently of said shaft, such as a rotatable member that operates at a constant speed, or a member that operates at a variable speed responsive to the changes in a condition, such as the volume of flow of a liquid, or something of that character.

It is a particular purpose of my invention to provide means for controlling the speed of a rotatable member, such as a shaft, by means responsive to a change in a condition, such as the variations in flow of a liquid, said means for controlling the speed of the shaft including a rotatable member driven independently of said rotatable shaft. The changes in the condition may be imposed upon the controlling means, either by having the independently rotatable means vary in its speed in response to the changes in said condition, or by having means responsive to changes in said condition associated with a member driven by the shaft, the speed of which is to be controlled, which means determines the operation of a member, the rotation of which is to be compared with the independently rotatable member. In the latter case the means, which is responsive to the changes of condition, that is to be utilized for controlling the speed of the shaft, is utilized to determine the arc through which the rotatable member, that is adapted to be driven by said shaft, is to turn during the time that a member rotating at a constant speed turns through a predetermined constant arc. By comparing the rate of rotation of the shaft, modified by the distance through which it rotates, with a member rotating at a constant speed through a definite arc, the rate of rotation of the shaft that is to be controlled, is controlled not only in accordance with a definite constant, but is also controlled with reference to a variable condition and in proportion to the variation in that condition. This is particularly useful in feeding materials in proportion to the rate of flow of a liquid, such as water treating materials, for example, in proportion to the volume of water to be treated. By utilizing an indicator that indicates the rate of flow for providing the adjustment of the arc through which the rotatable member is to be driven by the shaft during the time that the member rotating at a constant speed rotates through a definite arc, the shaft of a feeding device can be regulated in speed in direct proportion to the flow of the liquid that is to be treated by the material fed by said feeding device.

It is a particular purpose of my invention to provide means for either increasing or decreasing the speed of a shaft, the operation of said device to either increase or decrease the speed of a shaft being controlled by two rotatable members, one of which is driven by the shaft and the other of which is driven independently of the shaft in a manner, that said means for either increasing or decreasing the speed of the shaft, compares the speed of the member driven independently of the shaft with the member driven by the shaft at intervals occurring closely together, so that the speed of the shaft, that is to be controlled is practically constantly under control so that no appreciable variation from an exact proportion between the speed of the shaft and the condition indicated or measured by the indicating or measuring means utilized for controlling the speed of the shaft will exist at any time.

Instead of utilizing a means responsive to a condition, such as the variations in flow of a liquid, for controlling the speed of the shaft, manually operated means may be provided for changing the ratio of speed between the independently rotatable member and the member rotated by means of the shaft, the speed of which is to be controlled, so that a certain definite indicated ratio between the two speeds can be maintained, and it will be obvious that the manually operated means can be so calibrated as to indicate revolutions per minute, or any other desired scale can be utilized.

It is an important purpose of my invention to provide a controlling device of the above mentioned character, that is so closely responsive to variations in speed from that which is desired, that when a change in the adjustment of the means controlling the speed takes place, either by means of some measuring or controlling means, or by manual adjustment thereof, there will be a prompt adjustment of the speed of the shaft and a maintenance of said speed without any fluctuations over either a long or short period of time between a speed above and below that which is desired, which fluctuation in many devices, is substantially a continuing condition, which may be referred to as "hunting." My improved device practically entirely eliminates any such an action as "hunting", due to its quick and accurate response to any change in condition and its close maintenance of the desired ratio between the member that is rotated independently of said shaft at either a constant or a variable speed and the speed of said shaft.

It is a further purpose of my invention to provide means whereby a second variable can be introduced into the control, so that the controlling device will not only be responsive to a variation in a condition that is measured by some suitable instrument constantly measuring and/or indicating said condition, but that the ratio maintained between the change in said condition and the speed of the shaft can be varied in a manner that may be desired by the operator of the apparatus. Thus in treating water, it may be desirable to vary the proportions between the treating materials and the water in accordance with conditions found to exist upon an analysis of the water, as well as in accordance with the quantity of water that is treated.

It is another purpose of my invention to provide means for utilizing an indicator, which indicates the rate of flow of a liquid, in conjunction with my apparatus to indicate the quantity of liquid that has passed the point of measurement, thus providing a totalizing or integrating metering device, as well as an indicating device to indicate rate of flow.

It is a particular purpose of my invention to provide means for controlling the rate of rotation of a rotatable member that has a variable speed, which comprises a pair of members mounted each for an arcuate movement about an axis, and to provide means for moving one of said pair of members independently of the rotatable member, the rate of rotation of which is to be controlled, and means for moving the other of said pair of members by the rotatable member at a speed proportional to that of the rotatable member through an arc that is determined by a member, the position of which varies in accordance with some change in condition, and to provide switching means actuated by said members having the arcuate movement, whereby the speed of the shaft is controlled through a suitable speed changing means that is actuated to speed up the shaft under one circuit condition and to slow down the shaft under another circuit condition, the order of actuation of said switching means relative to each other determining the circuit conditions that exist.

It is another specific purpose of my invention to provide means actuated by a pair of rotatable members moving through certain arcs at each movement thereof, to compare the time interval consumed in the movement of one thereof through its arc, relative to the other thereof, which comprises a pair of members having alternative positions, said members being provided with switching means that control circuits, which operate means for regulating the speed of one of said members, so that it will be brought to such a speed that it will move through the particular arc through which it moves in the same interval of time as the other of said members moves through its particular arc. These arcs of movement can be fixed in the case of both members or in the case of only one thereof, the other arc being variable, and one of said members can be rotated at a constant speed, or both of said members can be rotated at variable speeds. The one member, however, is always used as a standard for determining the interval of time during which the other member must make an arcuate movement that is determined by means of a stop, which can be either adjustable or fixed, as may be found desirable, dependent upon the use to which the apparatus is put.

It is a further purpose of my invention to provide means for restoring the members having the alternative positions, carrying the switching members to their starting position, which is one of the alternative positions thereof, and to provide means for starting the arcuate movements of the two rotatable members having such arcuate movements, simultaneously, said means comprising a clutch device actuated after both of said switching members have been moved to their second position, or that alternative to the starting position, to release said switching means to return the same to their starting position and release said members rotatable through an arc to return the same to their starting positions and permit the same to be rotated by the means that move the same through their arcuate paths.

Other objects and advantages of my invention will appear as the description of the drawings proceeds. I desire to have it understood, however, that I do not intend to limit myself to the particular details shown or described, except as defined in the claims.

Figure 1:
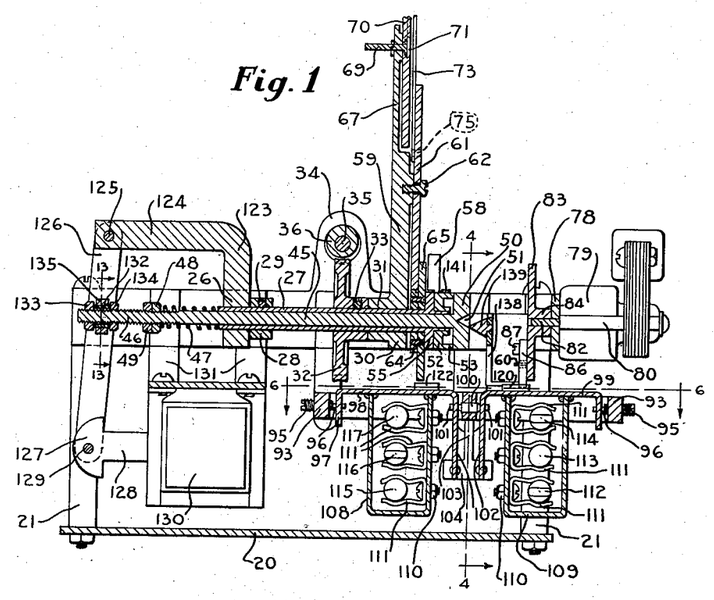
Fig. 1 is a vertical sectional view, partly broken away, through my improved controlling device, the section being taken substantially on the line 1—1 of Fig. 2.
Figures 2, 3, 8:
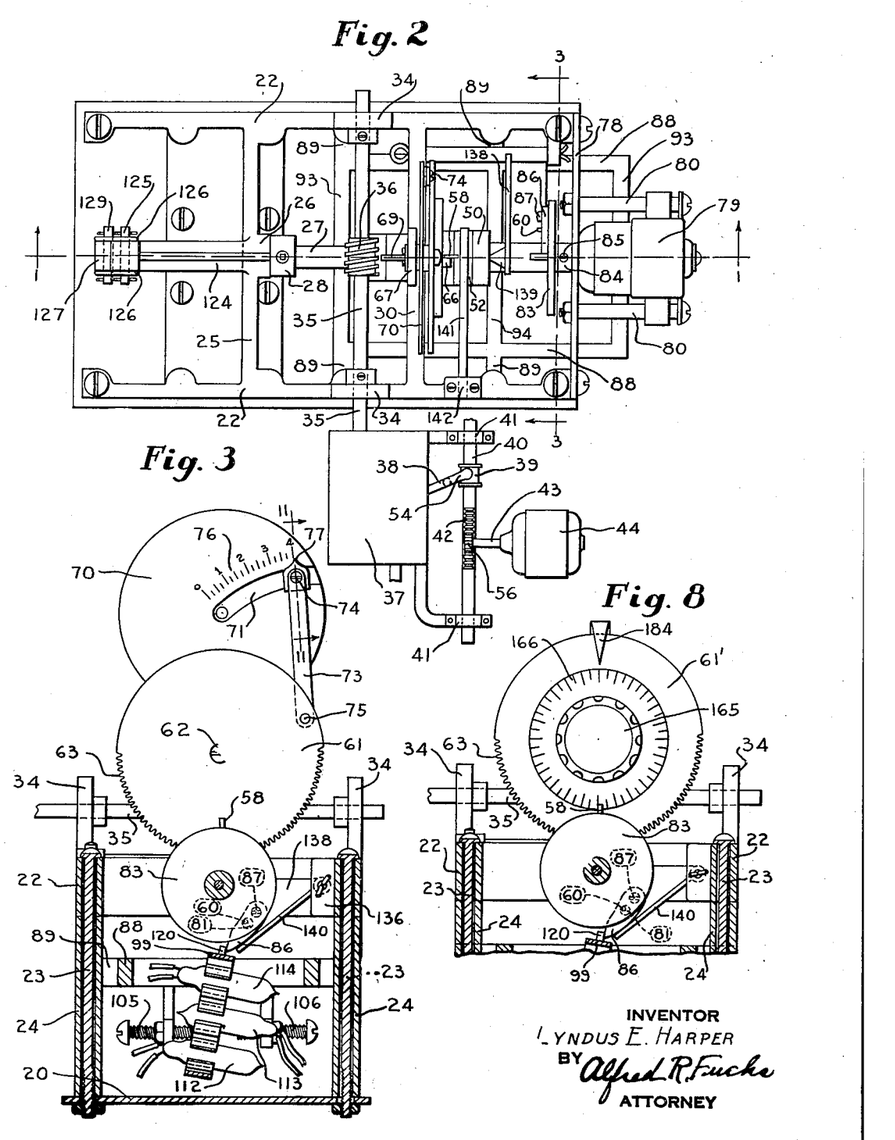
Fig. 2 is a top plan view thereof.
Fig. 3 is a section taken on the line 3—3 of Fig. 2 on a somewhat enlarged scale.
Fig. 8 is a fragmentary section, similar to Fig. 3, of another modification.

Referring in detail to the drawings, my improved controlling device is shown as being provided with a base member 20, from which the standards 21 extend upwardly, supporting a frame 22, said standards being made up of bolt-like members 23 and spacing sleeves 24, as shown in Fig. 3. The frame 22 is provided with a transverse member 25, which has a bearing 26 provided therein, in which a sleeve-like member 27 is mounted for rotation. A collar 28 is secured to the sleeve-like member 27 in fixed position by means of the set screw 29, acting as a stop engaging the bearing member 26 to prevent endwise movement of the sleeve-like member 27 toward the left in Fig. 1. The frame 22 also has a transverse member 30 thereon, spaced from the member 25, which has a bearing 31 therein for said sleeve-like member 27. A worm gear 32 is fixed to the tubular shaft 27, by means of a set screw 33, said gear engaging the bearing 31 and preventing movement of the tubular member 27 toward the right in Fig. 1.

Said frame 22 is further provided with a pair of upstanding bearing members 34, in which the shaft 35, the speed of which is to be controlled, is mounted for rotation. Said shaft 35 has a worm 36 provided thereon that meshes with the worm wheel or worm gear 32. The sleeve 27 is thus driven constantly by means of the shaft 35 and at a rate in proportion to the rate of rotation of shaft, the provision of the worm and worm wheel, of course, rotating the sleeve 27 at a much slower rate than that of the shaft 35.

Said shaft 35 is provided with any suitable means for varying the rate of rotation thereof, such as a variable speed transmission, indicated generally at 37, the output speed of said transmission being controlled by means of a lever 38, the position of said lever being determined by means of a grooved collar 39, with which the forked end 54 of said lever engages, said grooved collar being fixed on a shaft 40 that is longitudinally slidably mounted in bearings 41, provided on any suitable brackets on the variable speed transmission member 37, and which has a rack 42 fixed thereon, which meshes with a suitable pinion 56 provided on the shaft 43 of a motor 44, which is reversible so as to be capable of rotation in either direction. It will, of course, be understood that the rotation of the shaft 43 by means of the motor 44 in one direction will cause the rack 42 to travel in one direction, moving the shaft 40 endwise in a corresponding direction, while rotation of the shaft 43 in the reverse direction upon reversal of the motor will cause the rack 42 to travel in a reverse direction and the direction of endwise movement of the shaft 40 to be reversed.

It is, of course, to be understood that, while the variable speed transmission device 37, controlled by a reversing motor 44, is shown as being directly connected with the shaft 35, any suitable mechanism may be driven by the variable speed mechanism and can be interposed between said variable speed mechanism and that portion of the shaft 35 that carries the worm 36. It is highly desirable, and it is my intention, to control the exact speed of the output shaft of an apparatus in which there might be some losses between the means propelling the same and said output shaft, and accordingly the shaft 35 is intended to represent such an output shaft, the controlling apparatus being always installed so as to be connected with such an output shaft that directly drives the apparatus, such as a chemical feeding device, that is to be controlled by the controlling means.

Mounted within the sleeve-like member 27, so as to be rotatable therein, and also endwise movable therein, is a shaft 45, which has a threaded end portion 46, a compression spring 47 being mounted between the end of the tubular member 27 and an adjustable stop member 48, shown in the form of a nut, threaded on the threaded portion 46 and held in adjusted position by means of a lock nut 49, the spring 47 thus tending to urge the shaft 45 endwise toward the left in Fig. 1.

A head 50 is formed on the end of the shaft 45, said head 50 having a conical recess 51, provided centrally thereof in the end face of the same. Said head member 50 is part of a friction clutch mechanism comprising the co-operating clutch member 52, which is rotatably mounted on the sleeve-like member 27, said member 52 having an annular flange 53 that is adapted to be engaged by the disk-like head 50 to move the same toward the left in Fig. 1, toward the disk-like member 55 formed on the tubular member 27. The action of the clutch member 50 is to crowd the member 52 toward the member 55 under the action of the spring 47, causing said member 52 to be frictionally driven by the member 55 and thus be rotated with the tubular member 27. The disk 52 has an elongated finger member 58 projecting axially therefrom, which serves a purpose to be described below.

The cross member 30 has an upward extension 59 thereon, to which a disk-like member 61 is secured by means of a screw-threaded headed member 62. Said disk-like member is rotatably mounted on the screw 62 and has teeth 63 on a portion of the periphery thereof, which mesh with teeth on the periphery of a small gear 64, rotatably mounted on the sleeve 27 and having fixed thereto, to rotate therewith, by any suitable fastening means, such as those shown in Fig. 1, a disk-like member 65, which has a stop lug 66 projecting therefrom, with which the finger 58 is adapted to engage. The upward extension 59 has a reduced portion 67, which is provided with a bearing for a shaft 69 that is rotated by any suitable means, such as a movable indicating member, or means driven by a movable indicating member, any indicating member being adapted to be associated therewith in a manner to drive the shaft 69, depending upon the particular condition, or conditions, that are to be indicated by the indicating member and utilized to control the rate of rotation of the shaft 35.

Fixed on the shaft 69 to rotate therewith is a disk-like member 70. Said disk-like member 70 is shown more in detail in Fig. 3, and is provided with an arcuate slot 71 that extends to the axial center of the member 70, and from said center outwardly to the periphery of said member 70. The slot 71 has undercut side walls, and a member 72 having a similarly beveled peripheral edge is slidably mounted in the slot 71 and is secured to the link 73 by a screw-threaded headed member 74. The link 73 is thus pivoted to the member 74 and is also pivoted to the disk 61 by means of a screw-threaded headed member 75. A scale 76 may be provided adjacent the slot 71 and a pointer 77 may be formed on the member 72 co-operating with the scale 76.

It will be obvious that, if the end of the link, that carries the member 72 adjustable in the slot 71, is mounted so that it is at the end of the slot that is located at the center of rotation of the disk 70, rotation of said disk 70 will in no manner affect the position of the disk 61. However, as the link 73 is swung outwardly by movement of the member 72 in the slot 71 the relative rotation of the member 61 to the member 70 will be increased, and when said member 72 reaches the outer end of the slot the disk-like member 70 and the disk-like member 71 will be rotating through substantially the same arc. The disk-like member 70 is rotated by means of the indicating member that rotates the shaft 69, and thus the disk-like member 61 having the gear teeth 63 thereon will be rotated thereby, through the link 73, but in a ratio to the movement of the shaft 69, dependent upon the position of the member 72 in the slot 71. It will be obvious that the position of the stop 66 will be determined by the rotation of the shaft 69 by means of the metering or indicating means that drives the same, and by the adjustment of the link 73 along the slot 71. The position of the stop 66 is thus dependent upon a condition that is indicated by the indicating member, and is also dependent upon an adjustment that is made manually by means of the scale 76 and pointer 77 on the member 72 adjustable in the slot 71.

The frame 22 is also provided with a cross member 78, to which is secured a motor 79, said motor being secured in any desired manner, as by means of the bolts 80. The motor 79 is a synchronous induction motor rotating at a certain definite number of revolutions per minute, in step with the alterations of the alternating current that is supplied thereto. Said motor has a shaft 82 extending through a bearing opening in the cross bar 78 and has a disk-like member 83 mounted thereon, said disk-like member 83 having a hub portion 84, which is fixed to the shaft 82 in any desired manner, as by means of the set screw 85. A finger 86 is pivotally mounted on the disk-like member 83, extending substantially circumferentially thereof, and being shown as being secured thereto by means of the headed screw-threaded member 87. The finger 86 has an opening 81 therein, into which a small pin 60, mounted on the member 83, extends to limit the movement of said finger in both directions. Said finger 86 normally projects outwardly beyond the periphery of the disk-like member 83, as will be evident from Fig. 1. The shaft of the motor 79 rotates in the same direction as does the sleeve, or tubular member 27.

The sub-frame 88 having the laterally extending bracket portions 89 is mounted below the frame 22 in spaced relation therefrom, by means of the screw-threaded members 90, which extend through the brackets or ears 89, the heads 91 thereof engaging the under sides of said brackets, and the threaded portions thereof engaging in screw-threaded openings 92 in the frame 22, spacing sleeves 119 being provided between the frames 22 and 88. The sub-frame 88 has end members 93 and a central transverse member 94. The members 93 are provided with screw-threaded openings therein, that receive the screw-threaded adjustable bearing members 95 that have reduced ends 96 mounted in openings in depending ears 97 of the tiltable switch frames 98 and 99, respectively.

Figure 4:
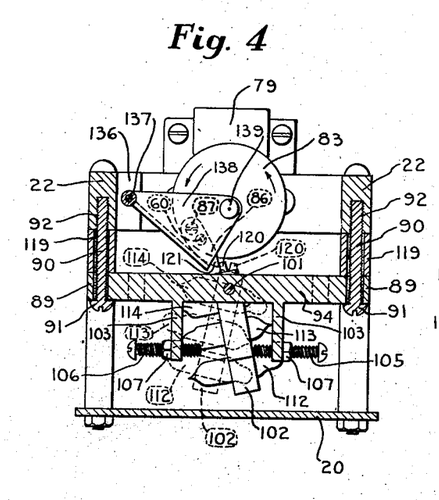
Fig. 4 is a section taken on the line 4—4 of Fig. 1 on a somewhat enlarged scale.

A pivot member 100, having reduced end portions 101, is mounted in the member 94 and extends through pivot openings in the depending ears 102, provided on said switch frames 98 and 99. The depending ears 102 are much longer than the ears 97 and serve also as stop fingers that cooperate with adjustable stop members mounted on the sub-frame 88 to limit the movement of the switch frames. Each of the members 102 has similar cooperating stop members associated therewith. In Fig. 4 one set of such adjustable stop members is shown, the member 94 being provided with a pair of depending bracket members 103 having the transverse portions 104 at their lower ends, which transverse portions 104 are provided with screw-threaded openings receiving the screw-threaded adjustable stop members 105 and 106, said stop members 105 and 106 being made in the form of screw-threaded headed members, similar to bolts, and are held in adjusted position by means of the clamping nuts 107.

Each of the switch frames is provided with a U-shaped cage-like portion, said cage-like portion of the frame 98 being indicated by the numeral 108 and said cage-like portion of the frame 99 being indicated by the numeral 109. The U-shaped portions 108 and 109 are secured to the frames 98 and 99 in fixed position in any desired manner, as by welding. Each switch frame is provided with a plurality of openings in one of the vertical legs of the U-shaped portion thereof, through which bolt-like members 110 extend, that clamp the U-shaped spring clips 111 to said switch frame in spaced relation along said leg of said switch frame. Three of the clips 111 are provided on each switch frame, receiving, respectively, the liquid contact switching elements 112, 113, 114, 115, 116 and 117, the switching elements 112, 113 and 114 being mounted on the tiltable switch frame 99, and the switching members 115, 116 and 117 being mounted on the tiltable switch frame 98.

Figure 5:
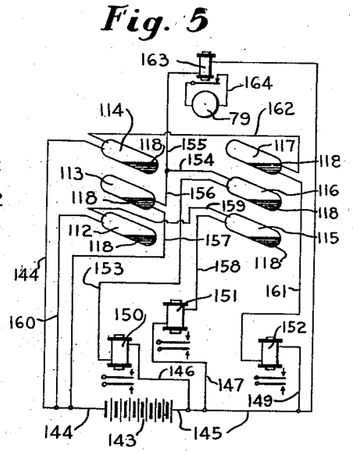
Fig. 5 is a diagram of the circuit utilized in my improved controlling device.
Figure 6:
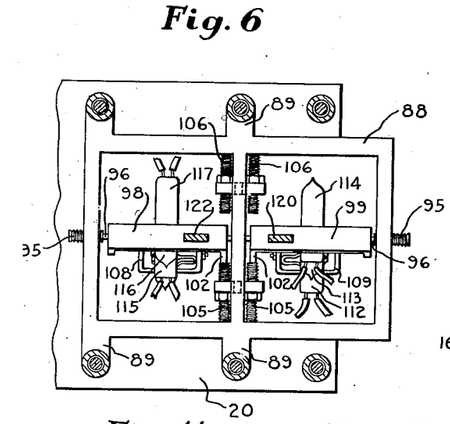
Fig. 6 is a fragmentary section taken on the line 6—6 of Fig. 1.

The stops 105 and 106, associated with said switch frames, are so adjusted that the liquid contact switching members, which are usually in the form of tubular members having contacts at one end thereof that are bridged by mercury, and which have alternative open and closed circuit positions, are in their one alternative position when the stop means on the switch frame, on which the same are mounted, is in engagement with the stop 105 and are in their other alternative position when the stop means on said switch frame is in engagement with the stop member 106. The alternative positions of the switching members mounted on the frame 99, are shown in full and dotted lines in Fig. 4, being shown in full lines when the stop member 102 is in engagement with the stop 105 and in dotted lines when the stop member 102 is in engagement with the stop 106. However, all the tiltable liquid contact switching members are not simultaneously in their open nor in their closed circuit positions. Thus in Fig. 4 the lowermost switching member 112 is shown in its open circuit position in full lines, and in its closed circuit position in dotted lines, while the switching member 113 is shown in its circuit closing position in full lines, and in its open circuit position in dotted lines, and the switching member 114 is shown in its open circuit position in full lines, and its closed circuit position in dotted lines in Fig. 4. Said switching members are shown diagrammatically in Fig. 5 in the same position as shown in full lines in Fig. 4, the liquid contact means being indicated in Fig. 5 by the numeral 118. The contact members 115, 116 and 117 are also shown in Fig. 5 in the position which these would have when corresponding to the full line position of the members 112, 113 and 114, shown in Fig. 1, that is, with the stop means 102 on the frame 99 in engagement with the stop means 105 on the frame 88.

The switch frame 99 is provided with a lip or fin 120, which is so located thereon that the beveled end 121 of the finger 86 on the member 83 will engage therewith upon rotation of the member 83 in the direction indicated by the arrow, which is the direction in which said member is rotated by means of the motor 79. It will be obvious that the finger 86 will move the switch frame 99 toward the dotted line position shown in Fig. 4, such movement continuing with the member 83 until the member 102 engages the stop 106, whereupon movement of the member 83 will be stopped until the end 121 of the finger 86 becomes disengaged from the member 120, The normal tendency of the switch frame is to have the full line position shown in Fig. 4 with the member 102 against the stop 105. This is, preferably, accomplished by providing such a distribution of weight of said tiltable switch frame and the switch means carried thereby that it will have a normal tendency to move about the pivot 101 and the pivot 96 toward the stop 105, although, of course, any suitable spring means could also be provided to accomplish this, if desired.

A lip or fin 122 is provided on the switch frame 98, which is mounted in such a position on said switch frame that the finger 58 will engage therewith when the clutch member 52 is rotated with the tubular member 27, said member 27 rotating in the same direction as the member 83. It will be obvious that the arc through which the member 58 swings, from its position in engagement with the stop 66 to that at which it tilts the switch frame 98, due to engagement with the lip 122, from a position thereof corresponding to that of the switch frame 99, shown in full lines in Fig. 4, to a position corresponding to that shown for the switch frame 99 in dotted lines in Fig. 4, will depend upon the position that said movable stop 66 will have, and this position is dependent upon the position of the indicating member that controls the movement of the shaft 69 and the adjustment of the one end of the link 73 relative to the member 70.

The transverse member 25 of the frame 22 is provided with an upwardly extending bracket 123, which has an arm 124, to the extremity of which is pivoted, by means of a pivot pin 125, a pair of links 126. Said links 126 are pivotally connected at their lower ends with a head 127 on a plunger 128, by means of the pivot pin 129. The plunger 128 is the armature of a solenoid 130, which is mounted in any suitable manner, as by means of the brackets 131 on the frame 22. The outer end of the threaded portion 46 of the shaft 45 has threaded thereon a sleeve 132, which is held in fixed position thereon by means of the lock nuts 133 and 134. The sleeve or ring 132 is rotatably mounted in the collar 135, having aligning pivot members 182 projecting therefrom that engage in suitable bearing openings 183 in the links 126.

It will be obvious upon reference to Fig. 1 that if the solenoid 130 is energized the plunger 126 will be drawn inwardly into the solenoid and the shaft 45 will be moved endwise toward the right against the tension of the spring 47, causing the clutch member 50 to disengage from the clutch member 52. Except when said solenoid is energized, the clutch member 50 and the clutch member 52 will be in engagement and will hold the member 52 frictionally in engagement with the clutch member 55 to cause rotation of the member 52 with the sleeve 27. Also, due to the frictional engagement of the member 50 with the member 52, the shaft 45 will be rotated, this rotation being permitted because of the rotative mounting of the member 132 in the member 135.

The frame 22 is provided with a bracket 136, upon which a finger releasing member 138 is pivotally mounted on the pivot member 137. A conical projection 139 is provided on said member 138, the outer surface of which is inclined in a similar manner to the wall of the recess 51, said projection 139 having a position relative to the recess 51, that is substantially that shown in Fig. 1, when the clutch members are in engagement. Upon disengagement of the clutch members, however, the clutch member 50 forces the member 138 upwardly so that the cone 139 will seat in the recess 51, swinging the same simultaneously with such movement about its pivot 137 and causing the laterally extending lip or flange 140 on the member 138 to engage with the finger 86, swinging the same upwardly out of engagement with the lip 120 on the switch frame 99. When this occurs the switch frame 99 will return to its position with the stop 102 in engagement with the stop 105. The motor 79 is a self-starting induction motor and will immediately begin rotation in the direction indicated by the arrow in Fig. 4, upon release of said finger 86 from the lip 120, and return of the switch frame to its full line position.

Means is provided for moving the clutch member 52 in a reverse direction to that in which it is turned by means of the tubular member 27, or in a direction to cause the finger 58 to engage the stop 66, said means comprising a flat spring 141, which is secured to the member 52 at one end thereof, being partly coiled around the same and having the opposite end thereof secured to the frame by means of a clamping member 142 mounted on the frame 22. The coiled portion of the spring 141 is wound up around the member 52 when the member 52 is rotated along with the sleeve 27, and upon release of the clutch member 50 from the clutch member 52, said spring immediately and substantially instantaneously throws the member 52 through an arc from a position with the finger 58 in engagement with the lip 122 on the switch frame member 98 to its position with the finger 58 in engagement with the stop 66.

The switching members 112, 113, 114, 115, 116 and 117 are so arranged and connected in an operating circuit that if the switch frame 99 is tilted by engagement of the finger 86 with the lip 120 before the switch frame 98 is tilted by engagement of the finger 58 with the lip 122 on the switch frame 98, such circuit connections will be made that the motor 44 will be rotated in a proper direction to move the lever 38, so as to increase the speed of the shaft 35, while if the finger 58 engages the lip 122 before the finger 86 engages the lip 120, circuit connections will be made by the switching means such that the motor 44 is rotated in an opposite direction to that previously mentioned and the lever 38 is moved in the opposite direction to that previously mentioned, causing the shaft 35 to be slowed down in speed, while if the finger 58 engages the lip 122 simultaneously with the engagement of the finger 86 with the lip 120 the circuit to the motor 44 will not be completed and there will be no change in position of the lever 38 and no change in the speed of the shaft 35.

Such an operating circuit is shown in Fig. 5, in which a battery 143 has conductors 144 and 145 extending from the opposite poles thereof. Connected with the conductor 145 are the conductors 146, 147 and 149. The conductor 146 leads to a relay 150, the conductor 147 leads to a relay 151, and the conductor 149 leads to a relay 152. From the relay 150 the conductor 153 leads to the switching member 116 and a conductor 154 also leads from said switching member 116, said conductors 153 and 154 being, of course, connected with the contacts of said switching member 116 that are bridged by the liquid contact means 118 therein when the switching member 116 is in the alternative position to that shown in Fig. 5. The conductor 154 is connected with the conductors 155 and 156, the conductor 156 leading to one of the contacts of the switching member 113, and the other contact of the pair in the switching member 113, bridged by the liquid contact means 118 therein, has a conductor 157 leading therefrom, which is connected with the conductor 144. The circuit through the relay 150 will be open when the parts are in the position shown in Fig. 5, which is the position which the switching members normally assume, or that which these have before being tilted by engagement of the fingers 58 and 86 with the switch frames on which said contact members are mounted.

From the relay 151 a conductor 158 extends to one of the contacts provided in the switching member 115, the cooperating contact of the pair in said switching member, adapted to be bridged by the liquid contact means 118, having a conductor 159 extending therefrom to one of the co-operating contacts of the switching member 112, a conductor 160 leading from the other of the cooperating contact of the switching member 112, adapted to be bridged by the liquid contact means 118, to the conductor 144. It will be noted, that in the position of the switching members 115 and 112, shown in Fig. 5, which is that assumed by the same before the fingers 58 and 86 have acted on the switch frames to tilt the same, the circuit in which the relay 151 is located will be open.

From the relay 152 a conductor 161 extends to one of the cooperating contacts of the switching member 117, the other cooperating contact of the switching member having the conductor 162 extending therefrom to one of the pair of co-operating contacts of the switching member 114, the other cooperating contact of the switching member 114 being connected with the conductor 144. It will accordingly be noted that the circuit in which the relay 152 is located will be open when the switching members 117 and 114 are in the position shown in Fig. 5, which is that of said members before the frames 98 and 99 have been tilted by means of the fingers 58 and 86.

The conductor 155 and the conductor 145 are connected with a relay 163, which controls the circuit 164 of the motor 79. While the relay 163 is energized the operating circuit for the motor 79 is closed, this condition existing when the parts are in the position shown in Fig. 5, because the circuit is completed from the conductor 155 through the conductor 156, and the switching member 113 to the conductor 144. However, as soon as the frame 99 is tilted from the full line position shown in Fig. 4, the switching members 112, 113 and 114 will assume a position with the opposite ends thereof upwardly to that shown in Fig. 5. Thereupon the circuit will be broken through the switching member 113 and the motor 79 will be stopped, thus preventing any damage thereto, due to engagement of the finger 86 with the lip 120 after the stop 106 has been engaged by the stop 102 on the switch frame 99.

If said switching members 112, 113 and 114 are moved to their alternative positions from those shown in Fig. 5, by tilting of the frame 99, and the other switch frame 98 is not moved from the position in which the switching members have the position shown in Fig. 5, the circuit in which the relay 150 is located will remain open, the circuit in which the relay 151 is located will also remain open, while the circuit in which the relay 152 is located will be closed, due to the fact that the circuit will be completed through the conductors 149, 161, switching member 117, conductor 162, switching member 114 and conductor 144. The relay 152 closes an operating circuit to the motor 44 such that the pinion 56 is rotated in a direction to cause such endwise movement of the rack 42 and shaft 40 as to move the lever 38 in a direction to speed up the shaft 35. Thus, if the shaft 35 is rotating at a slower rate than is desired by comparison with the member 83 rotating at a constant speed and as determined by the position of the stop 66, the rate of rotation of the shaft 35 will be increased due to the tilting of the switch frame 99 before the switch frame 98 is tilted.

If the reverse action occurs, that is, if the switch frame 98 is tilted first, due to the fact that the finger 58 reaches the lip 122 before the finger 86 reaches the lip 120, then the contact members 112, 113 and 114 will remain in the position shown in Fig. 5, while the contact members 115, 116 and 117 will assume a position alternative to that shown in Fig. 5, with the opposite ends thereof upwardly to those shown in the diagram in Fig. 5. When such is the case the circuit in which the relay 150 is located will be closed, due to the fact that the circuit will be completed through the conductors 146, 153, switching member 116, conductor 154, conductor 156, switching member 113 and conductors 157 and 144. The relays 151 and 152 will each, however, be located in an open circuit, because the switching member 112 will be in open circuit condition, although the switching member 115 will be in closed circuit condition, and the switching member 117 will be in open circuit condition, and the switching member 114 will also be in open circuit condition.

As the relay 150 controls a circuit energizing the motor 44 to cause rotation of the same in the opposite direction to that in which it is rotated when the relay 152 is energized to close the motor circuit associated therewith, the motor 44 will be rotated in a reverse direction to that previously described and the pinion 56 rotated in the opposite direction, causing the lever 38 to be moved in the opposite direction to that previously described, and causing the speed of the shaft 35 to be decreased. Thus, if the shaft 35 is rotating at a higher speed than is desired in comparison with the rotation of the disk 83, the desired speed being determined by means of the position of the stop member 66, said speed will be reduced or retarded due to the actuation of the switching means comprising the members 115, 116 and 117 in the manner described.

If either the tiltable frame 99 or the tiltable frame 98 is tilted first, then the other tiltable frame will be subsequently tilted. Assuming that the tiltable frame 99 has been first tilted or moved to the alternative position to that shown in Fig. 5, and the tiltable frame 98 is subsequently so tilted, the relay 152 will have been operated to speed up the shaft 35 before the contact members 115, 116 and 117 are moved to the alternative position by the tilting of the frame on which these are mounted. However, when such tilting does take place, then the switching member 117 will be moved to open circuit position, breaking the circuit of the relay 152 and stopping the rotation of the motor 44 and the movement of the lever 38. Similarly the circuit in which the relay 150 is located will be closed, when the frame 98 is first tilted, and remain closed only until the frame 99 is tilted. It will accordingly be seen that the time interval between the tilting of either bank of switches and the tilting of the other bank of switches will determine the amount of movement of the lever 38 and the amount the speed of the shaft 35 is changed, and that this time interval is dependent on the speed of the shaft 35 and the position of the stop 66, determined by the variations in the condition affecting the indicating means actuating the shaft 69. Also, when tilting of the bank of switches consisting of the switches 115, 116 and 117 occurs subsequent to the tilting of the bank of switches 112, 113 and 114, the switching member 113 will be in an open circuit condition due to having been previously tilted, and the member 116, although in a circuit closing position, will not close the circuit of the relay 150. The tilting, however, of both of the switch members 112 and 115 to the alternative positions to those shown in Fig. 5, will close the circuit in which the relay 151 is located, through the conductors 147, 158, 159, 160 and 144. The relay 151 controls the actuation of the solenoid 130, the closing of the circuit of said relay 151 closing the circuit of the solenoid and energizing the same, which causes the plunger 128 to be drawn into the solenoid and moves the clutch member 50 to clutch releasing position, thus swinging the finger 86 out of contact with the lip 120 and causing the finger 58 to return to engagement with the stop 66. As soon as the apparatus is thus reset, both tiltable switch frames are released and move instantaneously back to their initial positions, which correspond to those shown diagrammatically in Fig. 5, breaking the circuit of the relay 151, thus de-energizing the solenoid 130 and causing the clutch 50 to re-engage, whereupon another cycle of operation of the apparatus takes place.

If the tiltable frame carrying the switching means 115, 116 and 117 is first tilted from the position shown in Fig. 5 to its alternative position, the frame carrying the switching members 112, 113 and 114 will be tilted subsequently thereto when the finger 86 reaches the lip 120, and the circuit in which the relay 150 is located, which had been previously closed, due to the tilting of the frame carrying the switching members 115, 116 and 117 will be opened due to the tilting of the switching member 113 to the alternative position to that shown in Fig. 5, while the circuit in which the relay 152 is located will remain open because the circuit through the switching member 117 was opened when said frame was tilted, but the circuit through the relay 151 will be closed in the same manner as previously described, thus again operating the clutch releasing means by energization of the solenoid 130 and returning the parts to their initial position for another cycle of operations.

It will be obvious from the above explanation, that if both tiltable frames are actuated or tilted at the same time from the position shown in Fig. 5 to the alternative position thereof, the only circuit that will be closed will be that through the switch members 112 and 115, in which the relay 151 is located, thus causing no operation of the motor 144 and causing no change in the speed of the shaft 35, but returning the parts to position for another cycle of operation by energization of the solenoid 130, which will cause the clutch to be released and the parts to be restored to initial position. The relays, of course, are of a type that will restore themselves to open circuit position after the circuit thereof has been broken.

Figure 9:
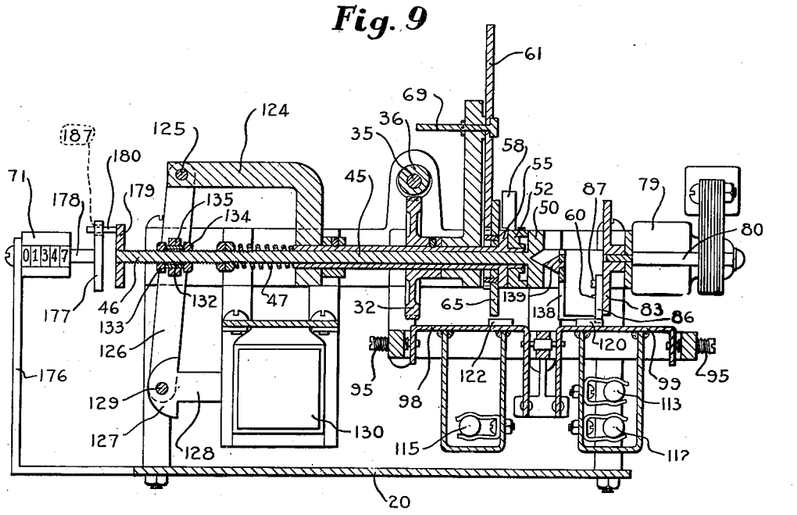
Fig. 9 is a vertical sectional view partly in elevation, taken substantially on the line 9—9 of Fig. 10, of a further modification.

Of course, if only control of speed is desired in a certain fixed ratio to the rate of rotation of the rotatable member 83 without any modification thereof in accordance with a setting of the apparatus by the operator thereof, by adjustment of the connection of the link 73 with the member 70, said link 73 can be permanently mounted on a fixed pivot on the member 70, or the member 70 can be dispensed with entirely and the shaft 69 provided on the member 61, as shown in Fig. 9, in which case the member 61 is moved to a position dependent directly upon the amount of rotation of the shaft 69, responsive to some indicating means, to control the speed of the shaft 35. Or, if desired, the speed of the shaft 35 can be entirely manually controlled by providing the arrangement shown in Fig. 8, in which the member 61', operating in precisely the same manner as the member 61, and associated with the remainder of the apparatus in exactly the same manner as the member 61, is shown in Figs. 1 and 2, can be provided, said member 61' having a knob 165 thereon, by which the same may be rotated to a desired position, and said member 61' can further be provided with graduations 166 thereon, with which any suitable indicator, such as the indicator 184, cooperates to indicate the setting of the member 61' for a desired speed of the shaft 35. Obviously the graduations of the scale 166 can be made to read directly in revolutions per minute, or any other scale that may be desired.

Figure 7:
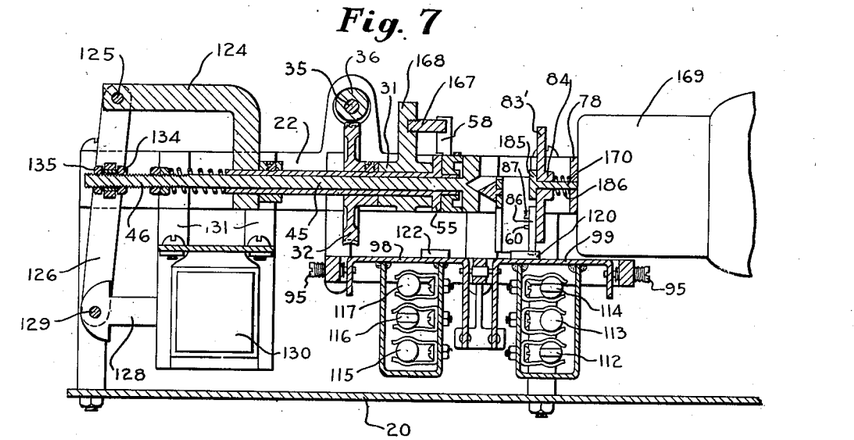
Fig. 7 is a view similar to Fig. 1, of a modification.

Another modification of the invention is shown in Fig. 7. In this form of the invention the rotatable means comprising the members 61, 70, and the link 73, and even the manually adjustable means 61', are done away with. Instead of having an adjustable stop, a fixed stop 167 is provided on the upwardly projecting bracket 168 on the frame 22, and instead of utilizing the motor 79 and disk-like member 83, a member 169, responsive to change in a condition, such as a water meter, for example, that is operated at a varying speed, depending upon the rate of passage of water therethrough, may be provided for operating the disk member 83', which operates in exactly the same manner as the disk 83, having a finger 86 thereon engaging the lip 120 on the switch frame 99 in the same manner as has been previously described, the meter 169 having a shaft 170, upon which the disk 83' is mounted. The disk 83' is frictionally driven by the shaft 170 through the friction clutch disk 185, and is held frictionally in engagement with said disk by the coil spring 186, so that after the switch frame 99 has been tilted and the stop 106 has been engaged by the stop 102, the meter 169 will not be damaged due to the stoppage of the rotation of the disk 83', as the friction clutch will slip.

It will be obvious that with the arrangement shown in Fig. 7, the speed of the shaft 35 will be determined by means of the rate of rotation of the shaft 170 of the meter 169, as, if the meter shaft 170 increases in speed, the finger 86 will reach the lip 120 before the finger 58 reaches the lip 122, causing the operation of the circuits in the manner previously described, to speed up the shaft 35, while if the shaft 35 is rotating at too rapid a speed for the speed of the shaft 170 the finger 58 will move from the fixed stop 167 to the lip 122 before the finger 86 engages the lip 120, causing the switching device to close such circuits as to speed up the shaft 35. It will also be obvious that with the arrangement shown in Fig. 7, the speed of the shaft 35 will be maintained at a definite fixed ratio to the speed of the shaft 170.

Figure 10:
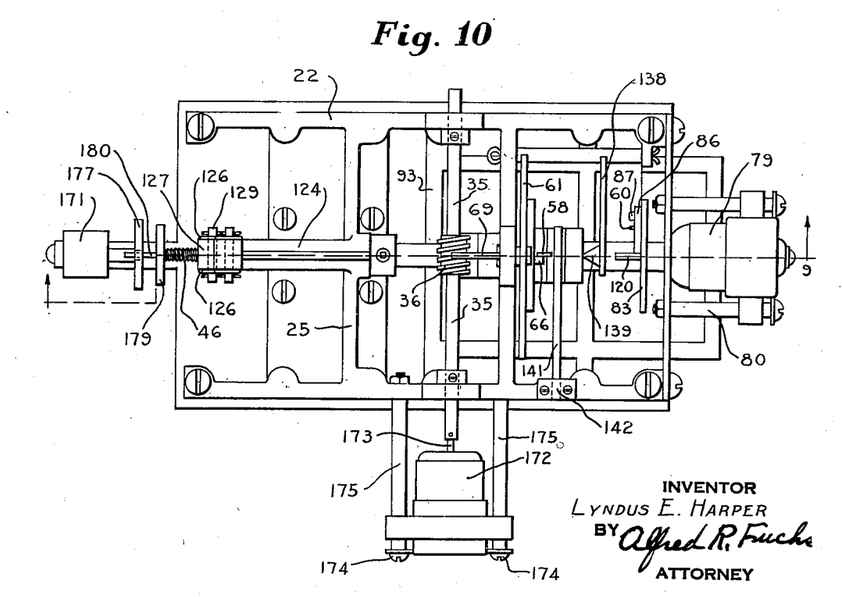
Fig. 10 is a top plan view of the form of the invention shown in Fig. 9.
Figure 11:
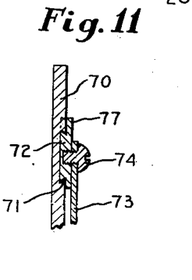
Fig. 11 is a fragmentary sectional view on an enlarged scale, taken on the line 11—11 of Fig. 3.

My apparatus can also be utilized to totalize or integrate the amount of liquid flowing through a certain passage, or conduit, or over a certain weir by providing float controlled means actuating the shaft 69 and utilizing the apparatus shown in Figs. 9 and 10. By providing the proper type of float and calibrating the apparatus properly, the rotation of the shaft 69 can be utilized to operate a revolution counter 171, which can be provided with a dial, or dials, that indicate a total in gallons or cubic feet, or any other unit of measurement desired. The only changes necessary in my apparatus to accomplish this, are to mount the member 61 on the shaft 69 to rotate therewith and provide the revolution counter and a connection between the same and the shaft 45 in a manner to be described below, and to provide, instead of a member, the speed of which is varied, for operating the shaft 35, a motor 172, that is provided with a shaft 173, connected with the shaft 35, which rotates said shaft at a constant speed, said motor being mounted on the frame 22 by means of the bolt-like members 174 and the spacing sleeves 175. The revolution counter 171 is mounted on a bracket 176, which is connected in any desired manner with the base member 20, and is provided with a coupling member 177 on the shaft 178 thereof, that cooperates with a coupling member 179, provided on the threaded portion 46 of the shaft 45, said coupling means being so constructed that the endwise movement of the shaft 45 in releasing the clutch means, does not disengage said coupling, any suitable coupling being usable, such as one that is provided with a pin 180 on the member 179, slidably mounted in an opening 181 in the member 77.

Figure 12:
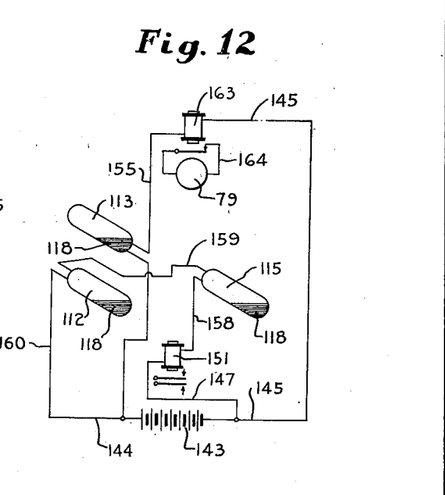
Fig. 12 is a circuit diagram of the circuit used in conjunction with the form of the invention shown in Figs. 9 and 10.
Figure 13:
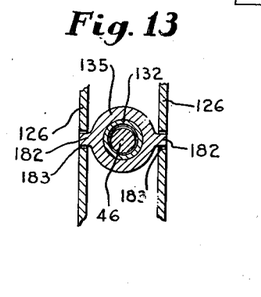
Fig. 13 is a fragmentary sectional view on an enlarged scale, taken on the line 13—13 of Fig. 1.

The switch frame 98 is provided with only one switching member 115 in the form of the invention shown in Fig. 9, and the switch frame 99 is provided with only the switching members 112 and 113 in the form of the invention shown in Fig. 9, the switching members 114, 116, 117, and the relays 150 and 152 being done away with. The circuit is very much simplified, the circuit utilized being shown diagrammatically in Fig. 12, the switching members being of the same type as previously described in connection with Fig. 5 and the same numerals being used to designate the parts retained in Fig. 12, as were used for the corresponding parts in Fig. 5. The motor 172 drives the shaft 35 at a constant speed and the motor 79 drives the disk-like member 83 at a constant speed. The clutch member 52, when engaged with the clutch member 55, by means of the clutch operating member 50, will rotate at the same speed as the tubular or sleeve-like member 27, which, of course, rotates at a constant speed in this form of the invention, due to the fact that said shaft 35 rotates at a constant speed.

The position of the stop 66 will be determined by means of the float actuated shaft 69, and the arc through which the member 52 will rotate from the stop 66 to the position thereof in engagement with the lip, or projection, 122 after the switch frame 98 has been tilted and its stop member 102 is in engagement with the cooperating stop member 106, will be determined by the amount said shaft 69 is turned by means of the float, or other actuating means therefor, which is proportionate to a quantity that is to be measured by the revolution counter 171. Due to the friction drive between the head 59 on the shaft 45 and the member 52, the head 59 will be carried through a corresponding arc. The finger 86 will engage the projection, or lip, 120 in the same manner as previously described to tilt the switch frame 99. If this occurs before the switch frame 98 has been tilted, then the switching member 112 will be in a circuit closing position at the time the switching member 115 is tilted to its circuit closing position, and the clutch releasing relay 151 will operate immediately to energize the solenoid 139 to release the clutch member 59 from the clutch member 52, thus halting the rotation thereof. If the tiltable frame 98 is first tilted by engagement of the finger 58 with the projecting lip 122, then the circuit in which the relay 151 is located will be energized to actuate the clutch releasing means as soon as the frame 99 is tilted. In the meantime, however, the clutch member 59 will not rotate any further, because the clutch member 52 will be stopped in its rotation, due to the fact that the finger 58 is in engagement with the lip 122 and the frame 98 is stopped in its movement because the stop finger 102 thereon is in engagement with the stop 106.

Accordingly, no matter which frame is first tilted, the shaft 45 will be rotated periodically through arcs that are in proportion to the arcuate movement of the shaft 69, by means of the indicator that actuates the same. Accordingly, as the indicator that actuates the shaft 69 indicates a rate of flow, or a speed, or any other variable condition of a similar character, the rotation of the shaft 45 will have a certain proportion thereto, which can, by proper calibration of the parts, operate the revolution counter to register, or indicate, the total quantity of liquid, for example, that may have passed through a certain passage at a rate that is indicated by the position of the rotatable member 69. Thus, if the member 69 is responsive in its position to a change in condition, such as the change in rate of flow of a liquid, the total quantity of liquid that has passed the point at which the measurement of rate of flow is being indicated, will be indicated by the revolution counter 171. The only purpose of the rotatable member 83 in this form of the invention is to cause the clutch to release at regular time intervals, whereby the exact ratio between the rotation of the shaft 45 and the rotation of the shaft 69 responsive to the indicating means, previously mentioned, is maintained.

What I claim is:

1. The combination with a shaft and means for rotating the same, of means for regulating the speed of said shaft in accordance with a variable condition the variations of which are entirely independent of the rotation of said shaft, comprising a member periodically rotated by said shaft, adjustable means controlling the movements of said member, and means responsive solely to the variations in said condition for adjusting said adjustable means.

2. The combination with a rotatable member, of a second rotatable member, separate independent means for rotating each of said rotatable members, and controlling means for the means for rotating said second rotatable member, comprising means for adjusting the speed of said second rotatable member to maintain a desired ratio between the speeds of said rotatable members.

3. The combination with a rotatable member, of a second rotatable member, independent means for rotating each of said rotatable members independently of the other rotatable member, controlling means for the means for rotating said second rotatable member comprising means for adjusting the speed of said second rotatable member to maintain a desired ratio between the speeds of said rotatable members, and means for varying said ratio.

4. An apparatus of the character described, comprising a rotatable member, means for rotating said rotatable member and means controlling the rate of rotation thereof comprising a movable member having a position responsive to a condition which is entirely independent of the speed of said rotatable member and speed changing means controlled by the position of said movable member.

5. An apparatus of the character described, comprising a rotatable member, means for rotating said rotatable member at a variable speed and means controlling the rate of rotation of said rotatable member, comprising a pair of members mounted each for an arcuate movement about an axis, means for moving one of said pair of members independently of said rotatable member, means for moving the other of said pair of members by means of said rotatable member at a speed proportional to that of said rotatable member, and means actuated by either of said pair of members upon completion of the arcuate movement thereof prior to the completion of the arcuate movement of the other thereof to change the speed of said means for rotating said rotatable member.

6. An apparatus of the character described, comprising a rotatable member, means for rotating said rotatable member at a variable speed and means responsive to a metering device controlling the rate of rotation of said rotatable member, comprising a pair of members mounted each for an arcuate movement about an axis, means for moving one of said pair of members independently of said rotatable member, means for moving the other of said pair of members by means of said rotatable member at a speed proportional to that of said rotatable member, and means actuated by either of said pair of members upon completion of the arcuate movement thereof prior to the completion of the arcuate movement of the other thereof to change the speed of said means for rotating said rotatable member.

7. In a device of the character described, a pair of switching members, a rotatable member having means for actuating one of said switching members, means for actuating the other of said switching members comprising a shaft, a member driven thereby, a second rotatable member, a stop therefor, means rotatively urging said second rotatable member toward said stop, clutch means connecting said member driven by said shaft with said second rotatable member to rotate the same away from said stop, switch actuating means on said second rotatable member, and a clutch actuating magnet energized upon actuation of both of said switching members to release said clutch means.

8. In a device of the character described, a pair of switching members, a rotatable member having means for actuating one of said switching members, means for actuating the other of said switching members comprising a shaft, a member driven thereby, a second rotatable member, an adjustable stop therefor, means responsive to a condition for adjusting said stop in accordance with changes in said condition, means rotatively urging said second rotatable member toward said stop, clutch means connecting said member driven by said shaft with said second rotatable member to rotate the same away from said stop, switch actuating means on said second rotatable member, and a clutch actuating solenoid energized upon actuation of both of said switching members to release said clutch means.

9. Means for controlling the speed of a shaft, comprising a rotatable member, means for rotating said member independently of said shaft, means for comparing the speed of said shaft with that of said independently rotatable member, comprising electrical operating circuits and switching means for selectively energizing said circuits in accordance with the relative speed of said shaft and said independently rotatable member, and electrically operated means for varying the speed of said shaft controlled by the selective energization of said circuits.

10. The combination with a pair of rotating elements, of means for comparing the rate of rotation thereof, comprising switch operating means and actuating means therefor comprising a member rotatable with each of said rotating elements, and each actuating one of said operating means upon reaching a predetermined point in its rotation from a predetermined starting point.

11. The combination with a pair of rotating elements, of means for comparing the rate of rotation thereof, comprising a member periodically rotatable with each of said elements, stop means establishing a starting point for each of said elements, a member having alternative positions actuated by each of said periodically rotatable members upon reaching a predetermined point in its rotation to move from one of such alternative positions to the other thereof, electrical circuits and circuit controlling means responsive to the relative time of actuation of the members having said alternative positions.

12. The combination with a pair of rotating elements, of means for comparing the rate of rotation thereof, comprising a member periodically rotatable with each of said elements, stop means establishing a starting point for each of said elements, one of said stop means being adjustable, a member having alternative positions actuated by each of said periodically rotatable members upon reaching a predetermined point in its rotation to move from one of such alternative positions to the other thereof, electrical circuits and circuit controlling means responsive to the relative time of actuation of the members having said alternative positions.

13. The combination with a pair of rotating elements, of means for comparing the rate of rotation thereof, comprising a member periodically rotatable with each of said elements, stop means establishing a starting point for each of said members, means responsive to variations in a condition for adjusting one of said starting points, electrical switching means actuated by each of said members upon reaching a predetermined point in its rotation and electrical circuits controlled by said switching means responsive to the relative time of actuation of said switching means.

14. The combination with a pair of rotating elements, of means for comparing the rate of rotation thereof, comprising a member periodically rotatable with each of said elements, stop means establishing a starting point for each of said members, tiltable switch carriers actuated by each of said members upon reaching a predetermined point in its rotation, switches carried thereby and means responsive to the relative time of actuation of the switch carriers, comprising electrical circuits selectively energized in accordance with the relative time of actuation of said means.

15. An apparatus of the character described, comprising an element continuously rotating at a uniform constant speed, means responsive to a condition variable entirely independently of the rotation of said element, and switching means controlled by said element for energizing an electrical circuit, and means controlled by said responsive means to determine the interval of time said circuit is energized.

16. In a device of the character described, a pair of tiltably mounted members, switching means carried by each thereof and movable between open and closed circuit positions therewith, a circuit in which said switching means are interposed in a manner that the position of each tiltably mounted member modifies the effect on said circuit of the position of the other thereof, said tiltably mounted members having a tendency to assume one of two alternative positions, and a pair of independently rotatable members each engaging a tiltably mounted member to move it to its other alternative position.

17. In a device of the character described, a pair of tiltably mounted members each having a normal tendency to assume one of two alternative positions, independently operating means for moving said members into the other of said alternative positions, and adjustable means for limiting the tilting movements of said members.

18. In a device of the character described, a pair of tiltably mounted members each having a normal tendency to assume one of two alternative positions, a pair of rotatably mounted members, independent means for periodically rotating each thereof through an arc, and means on each of said members engaging one of said tiltably mounted members to move the same to its other alternative position upon said rotatably mounted members reaching predetermined points in the arcuate movements thereof.

19. In a device of the character described, a pair of tiltably mounted members each having a normal tendency to assume one of two alternative positions, a pair of rotatably mounted members, independent means for periodically rotating each thereof, means on each of said members engaging one of said tiltably mounted members to move the same to its other alternative position upon said rotatably mounted members reaching predetermined points in the movement thereof, one of said rotatably mounted members being limited to an arcuate movement between a stop and the point at which it moves its tiltably mounted member to its other position, and means for adjusting said stop to vary the amplitude of said arcuate movement.

20. In a device of the character described, a pair of tiltably mounted members each having a normal tendency to assume one of two alternative positions, a pair of rotatably mounted members, independent means for periodically rotating each thereof, means on each of said members engaging one of sad tiltably mounted members to move the same to its other alternative position upon said rotatably mounted members reaching predetermined points in the movement thereof, one of said rotatably mounted members being limited to an arcuate movement between a stop and the point at which it moves its tiltably mounted member to its other position, means for adjusting said stop to vary the amplitude of said arcuate movement and the other of said rotatably mounted members moving through an arc of constant amplitude during each periodic rotation thereof.

21. In a device of the character described, a pair of tiltably mounted members each having a normal tendency to assume one of two alternative positions, a pair of rotatably mounted members, independent means for periodically rotating each thereof through an arc, and means on each of said members engaging one of said tiltably mounted members to move the same to its other alternative position upon said rotatably mounted members reaching predetermined points in the arcuate movements thereof, the means for rotating one of said members rotating at a variable speed.

22. In a device of the character described, a pair of tiltably mounted members each having a normal tendency to assume one of two alternative positions, a pair of rotatably mounted members, independent means for periodically rotating each thereof through an arc, and means on each of said members engaging one of said tiltably mounted members to move the same to its other alternative position upon said rotatably mounted members reaching predetermined points in the arcuate movements thereof, the means for rotating one of said members rotating at a constant speed.

23. In a device of the character described, a pair of tiltably mounted members each having a normal tendency to assume one of two alternative positions, a pair of rotatably mounted members, independent means for periodically rotating each thereof through an arc, and means on each of said members engaging one of said tiltably mounted members to move the same to its other alternative position upon said rotatably mounted members reaching predetermined points in the arcuate movements thereof, the means for rotating one of said members rotating at a variable speed determined by the relative time said tiltably mounted members move to said other position.

24. In a device of the character described, a pair of tiltably mounted members each having a normal tendency to assume one of two alternative positions, a pair of rotatably mounted members, independent means for periodically rotating each thereof, means on each of said members engaging one of said tiltably mounted members to move the same to its other alternative position upon said rotatably mounted members reaching predetermined points in the movement thereof, one of said rotatably mounted members being limited to an arcuate movement between a stop and the point at which it moves its tiltably mounted member to its other position, and means responsive to a condition for adjusting said stop to vary the amplitude of said arcuate movement.

25. The combination with a pair of elements rotating independently of each other, of means for comparing the speed of said elements, comprising a pair of members rotatable periodically with said elements, and means actuated by said periodically rotatable members for adjusting the speed of one of said elements so as to bear a desired ratio to the speed of the other element, comprising a speed adjusting member, electrically actuated means controlling the position thereof, and switches controlling said electrically actuated means operated by said members.

26. An apparatus of the character described, comprising a rotative element, indicating means responsive to variations in a condition independently of the rotation of said rotative element, means for determining a desired speed of said rotative element, comprising a stop, adjusting means for said stop actuated by said indicating means, means for comparing the actual speed of said rotative element with said desired speed, comprising a pair of circuit controlling members, a member rotating at a known speed, actuating means for said circuit controlling members rotatable with said member rotating at known speed and said rotative element, and speed adjusting means controlled by said circuit controlling members to adjust the speed of said rotative element the difference between said actual and desired speeds.

LYNDUS E. HARPER.